United States Patent
Grosjean et al.

(10) Patent No.: US 7,452,954 B2
(45) Date of Patent: Nov. 18, 2008

(54) POLYMER OF ETHYLENE

(75) Inventors: Abel Grosjean, Shoreacres, TX (US); Steven Don Sandstrum, Kingwood, TX (US); John Mark Zimmerman, Houston, TX (US)

(73) Assignee: Ineos Manufacturing Belgium NV, Antwerp (BE)

( * ) Notice: Subject to any disclaimer, the term of this patent is extended or adjusted under 35 U.S.C. 154(b) by 3 days.

(21) Appl. No.: 10/579,227

(22) PCT Filed: Nov. 5, 2004

(86) PCT No.: PCT/EP2004/012745

§ 371 (c)(1),
(2), (4) Date: May 12, 2006

(87) PCT Pub. No.: WO2005/049665

PCT Pub. Date: Jun. 2, 2005

(65) Prior Publication Data

US 2007/0135592 A1   Jun. 14, 2007

(30) Foreign Application Priority Data

Nov. 12, 2003  (GB) ................................. 0326415.7

(51) Int. Cl.
*C08F 110/02* (2006.01)
*C08F 210/02* (2006.01)
*C08F 4/24* (2006.01)

(52) U.S. Cl. ........................ 526/352; 526/106; 526/113; 526/348

(58) Field of Classification Search ................. 526/106, 526/348.2, 113, 348, 352
See application file for complete search history.

(56) References Cited

U.S. PATENT DOCUMENTS

| 6,174,981 | B1 * | 1/2001 | Bergmeister et al. ...... 526/348.2 |
| 6,331,599 | B1 | 12/2001 | Koch |
| 6,525,148 | B1 * | 2/2003 | McDaniel et al. ............ 526/111 |
| 6,867,278 | B2 * | 3/2005 | McDaniel et al. ......... 526/348.5 |

FOREIGN PATENT DOCUMENTS

| EP | 0 645 400 A1 | 3/1995 |
| EP | 1 359 192 A1 | 11/2003 |

\* cited by examiner

*Primary Examiner*—Caixia Lu
(74) *Attorney, Agent, or Firm*—Nixon & Vanderhye

(57) ABSTRACT

The invention relates to a polymer of ethylene which has a $\mu_o/\mu_2$ ratio of at least 13; and a high load melt index HLMI lower than 8 g/10 min, and a value of tan $\delta$ at $\omega/\omega c=0.01$ of less than 1.3, where $\delta$ is G"/G', $\omega$ is the frequency at which G" and G' are measured and we is the frequency at which G"=G', and G and G" are respectively the elastic modulus and viscous modulus, both measured in Pa at 190° C.; a process for making the polymer using a catalyst comprising chromium supported on a silica-titania support is also described.

11 Claims, 1 Drawing Sheet

Polymer C Profile          Polymer I Profile

POLYMER OF ETHYLENE

Figure 1:
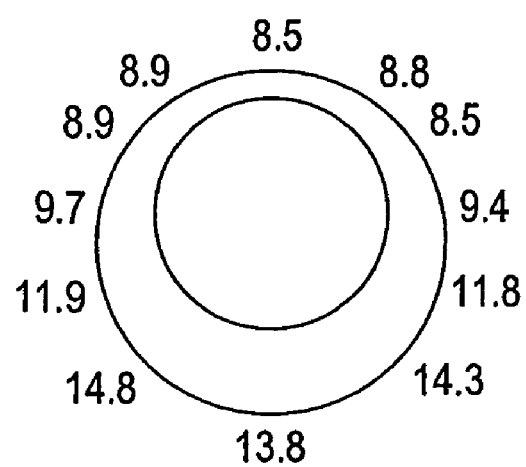
Figure 1:
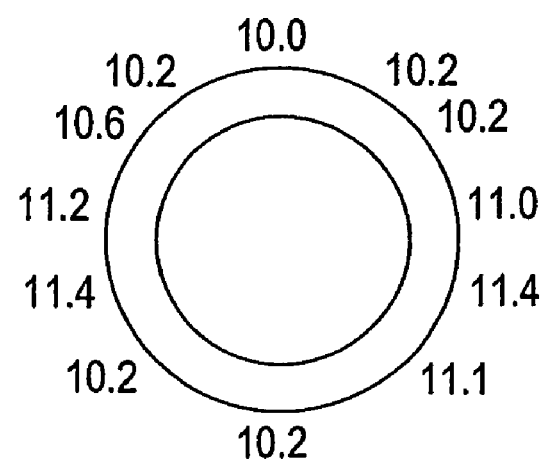

This application is the U.S. National Phase of International Application PCT/EP2004/012745, filed 5 Nov. 2004, which designated the U.S. PCT/EP2004/012745 claims priority to British Application No. 0326415.7 filed 12 Nov. 2003. The entire content of these applications are incorporated herein by reference.

The present invention relates to a new polymer of ethylene. It also relates to a process for the preparation of this polymer. Finally, it relates to a pipe which can be moulded from this polymer.

One important application for polymers of ethylene is the manufacture of pipes, for instance large diameter pipes. These pipes are typically formed by extruding the polymer through a die, and the resultant pipe must be tough and strong enough for appropriate commercial uses.

It happens frequently that, when polymers of ethylene designed to be extruded into pipes are processed at high extrusion rates, the melt temperature of the polymer rises considerably, and the dimensional stability of the final pipe suffers due to a phenomenon called "wall sag". This phenomenon occurs When the polymer lacks the melt strength which enables it to support its own weight at a certain temperature. This phenomenon can cause serious non-uniformity in pipe wall thickness.

One known way to reduce wall sag is by manually adjusting the die eccentricity, until an acceptable wall thickness profile is achieved. This tedious trial and error procedure can take up to four attempts to get the right profile. In Intern. Polymer Processing VII, n° 2, June 1992, pages 140-143, D. N. Githuku and A. J. Giacomin have proposed to reduce wall sag by rotating the pipe during cooling. This proposal remains cumbersome because it entails complicated numerical simulations which implies the use of additional hardware and control devices.

It has been discovered that modifying the mechanical and rheological properties of the polymers themselves, designed to be extruded into pipes, could solve the problem of wall sag.

Accordingly, it is a first object of the present invention to provide a new polymer of ethylene, designed to be extruded into pipes.

It is another object of this invention to provide a process for the preparation of said polymer of ethylene.

It is still another object of this invention to provide a pipe which can be moulded from said polymer of ethylene.

The enclosed single FIGURE diagrammatically shows the results of extrusion trials, using a polymer of ethylene according to the prior art and a polymer of ethylene according to the invention, to produce large diameter, heavy walled pipes. Pipe profile measurements taken at time of extrusion show melt sag when using the former versus the uniform wall distribution obtained when using the latter.

In its first aspect, the invention provides a polymer of ethylene which has:

a $\mu_0/\mu_2$ ratio of at least 13; and a high load melt index HLMI lower than 8 g/10 min, and a value of tan $\delta$ at $\omega/\omega c=0.01$ of less than 1.3, where $\delta$ is $G''/G'$, $\omega$ is the frequency at which $G''$ and $G'$ are measured and $\omega c$ is the frequency at which $G''=G'$, and $G'$ and $G''$ are respectively the elastic modulus and viscous modulus, both measured in Pa at 190° C.

In the above definition:

$\mu_0$ is the dynamic viscosity of the polymer, expressed in Pa·s and measured at a shear rate of 1 s$^{-1}$ at a temperature of 190° C.;

$\mu_2$ is the dynamic viscosity of the polymer, expressed in Pa·s and measured at a shear rate of 100 s$^{-1}$ at a temperature of 190° C. (For the purposes of the present invention, these viscosities have been measured by means of the capillary rheometric device disclosed in EP-A-0 210 689)

HLMI is the high load melt index of the polymer, which gives an indication of its melt viscosity and hence of its average molecular weight. It is determined in a melt indexer in terms of the melt output (g/10 min) under a given load (21.6 kg) through a standard die orifice. The determination of the HLMI value is made according to ASTM D 1238 condition F, 21.6 kg at 190° C.

Details of the measurement of G' and G" are given in the Examples.

The polymer of ethylene in accordance with the invention features a $\mu_0/\mu_2$ ratio of at least 13; higher values of the $\mu_0/\mu_2$ ratio reflects a relatively broad distribution of the molecular masses and a higher melt strength of the polymer; hence, preferably, this $\mu_0/\mu_2$ ratio is at least 14, more preferably higher than 15. Generally, this ratio is not higher than 20.

Values for $\mu_0$ of the polymer in accordance with the invention are generally comprised between $38\times10^3$ and $45\times10^3$ Pa·s. Higher values for $\mu_0$ are favourable to a decrease of the wall sag. Values for $\mu_0$ are thus preferably higher than $39\times10^3$ Pa·s; they are preferably lower than $43\times10^3$ Pa·s.

The polymer of ethylene in accordance with the invention features a HLMI of lower than 8 g/10 min. Preferably, the HLMI value of the polymer is lower than 7 g/10 min, more preferably lower than 6.5. Values of HLMI should preferably not be lowered to an extent rendering the processability of the polymer difficult and not be too high as to adversely affect the mechanical properties of the pipe to be extruded therefrom. Hence, the HLMI of the polymer is preferably not lower than 3 g/10 min. Interesting results have been obtained with polymers featuring a HLMI comprised between 4.5 and 6 g/10 min.

Preferably, the polymer of ethylene in accordance with the invention also features other properties defined hereafter.

It is preferred that said polymer has a density D (measured according to ASTM D 792 standard) comprised between 930 and 955 kg/m$^3$, more preferably between 935 and 950 kg/m$^3$, most preferably between 938 and 948 kg/m$^3$.

It is also preferred that said polymer has a Pent test value higher than 150. The Pent test (determined in accordance with ASTM F 1473-94 standard) is a measure of the environmental stress crack resistance of the polymer. More preferably, said polymer has a Pent test value higher than 350, most preferably higher than 450.

It is also preferred that said polymer has a polydispersity index MWD (represented by the ratio $M_z/M_n$ wherein $M_z$ is the z-average molecular weight and $M_n$ the number-average molecular weight (as defined for instance in H. Mark and N. Gaylord: Encyclopedia of Polymer Science and Technology, vol. 3, pages 612-616, Interscience Publishers, 1965) determined at 140° C. by using a Waters 150 CV gel permeation chromatograph with 1,2,4 trichlorobenzene as solvent) greater than 50, preferably greater than 60, most preferably greater than 70.

In accordance with the invention, the polymer of ethylene may be a copolymer of ethylene and at least one higher alpha-olefin. The comonomer, or higher alpha-olefin, is generally selected among those containing from 3 to 12 carbon atoms, preferably among propylene, 1-butene, 1-hexene and 1-octene.

1-hexene is especially preferred as comonomer. The amount of comonomer which may be present in the polymer of ethylene in accordance with the invention is generally comprised between 0.1 and 10 weight %, preferably between 0.4 and 5 weight %.

In another aspect, the invention provides a process for the preparation of a polymer of ethylene which has a $\mu_0/\mu_2$ ratio of at least 13 and a high load melt index HLMI lower than 8 g/10 min, wherein ethylene, and optionally at least one higher alpha-olefin, are contacted with a catalyst comprising chromium supported on a silica-titania support.

Catalysts comprising chromium supported on silica-titania supports are well known in the art. A general disclosure of these catalysts and their ways of preparation and activation is to be found e.g. in Advances in Catalysis, volume 33 (1985), pages 76-80 and in Journal of Catalysis, 82, (1983) pages 118-126.

A catalyst suitable for use in the process of the invention has the following general properties.

The catalyst comprises chromium on the support. The amount of chromium on said support is generally between 0.05 and 5 weight %, preferably between 0.1 and 3 weight %, most preferably between 0.8 and 1.5 weight %, such weight % being based on the weight of the support. The chromium is usually in the form of hexavalent chromium oxide, monodispersed on the surface of the support, and generally obtained by impregnating the support with a chromium compound and then calcining in the presence of oxidizing ambient to activate the catalyst (as described hereafter).

In accordance with the present invention, the definition "silica-titania support" designates a silica support containing titania. The support is generally coated with a layer of titania by any known way in the art. That means that, according to the invention, the titania is preferably not incorporated by a known coprecipitation method, like the coprecipitation of hydrous titania along with a silica gel. Preferably, the silica support is coated with a layer of titania by allowing a titanium ester to react with the superficial hydroxyl groups of the support. Unreacted ester groups are then burned away during the calcining mentioned hereabove. Preferably the support is coated with titania before being impregnated with chromium.

The amount of titania present on the support is expressed by the corresponding weight percentage of titanium, based on the weight of the support. The amount of titanium on said support is generally comprised between 1 and 10 weight %, preferably between 1 and 5 weight %, most preferably between 1.9 and 3.1 weight %.

The support generally has a specific surface area SA (measured in accordance with British Standard BS 4359/1) comprised between 350 and 650 m²/g, preferably between 400 and 600 m²/g, most preferably between 450 and 550 m²/g.

The support generally has a pore volume PV (measured by BET $N_2$ analysis using desorption isotherm and considering only radii of pores equal to at least 300 Angstroms) comprised between 0.8 and 3.5 ml/g, preferably between 1.3 and 3.0 ml/g, most preferably between 0.1.8 and 2.7 ml/g. The average diameter of the pores of the support is generally comprised between 50 and 300 Angstroms, preferably between 100 and 250 Angstroms, most preferably between 120 and 200 Angstroms.

As mentioned above, the catalyst should preferably be activated by calcining it in the presence of oxidizing conditions. This activation is generally performed at a temperature comprised between 500 and 900° C., preferably between 530 and 750° C., most preferably between 570° C. and 700° C.

Usually, the preferred oxidizing conditions are provided by air. The activation is generally carried out for a time period comprised between 5 minutes and 50 hours, preferably between 2 and 24 hours, most preferably between 5 and 12 hours. This activation allows for at least a portion of any chromium in a lower valence to be converted to a hexavalent state. Preferably, the activation of the catalyst is carried out in a stream of fluidized air before the activation temperature is reached and which is in turn replaced by an inert ambient when the catalyst is subsequently cooled.

The best results have been obtained with a catalyst resulting from the activation of the solid granular product commercialized by The PQ Corporation under the trade name CM-25305. One advantage of the process utilised in the present invention is that by employing a catalyst such as CM-25305, it has been found that a satisfactory polymer, having both a broad molecular weight distribution and also a satisfactory stress crack resistance, can be produced without the use of a cocatalyst.

The process for the preparation of the polymer of ethylene in accordance with the invention is carried out under any known polymerization conditions. The polymerization may be conducted in solution, in suspension or in the gas phase, in a continuous or batchwise way, for instance in one or a plurality of polymerization zones which include any reactor known in the art. For example, when a suspension polymerization is selected, a stirred reactor can be used for a batch process or the polymerization can be performed continuously in a loop reactor.

It is preferred to perform the process for the preparation of ethylene in accordance with the invention under slurry or gas phase polymerization conditions.

In accordance with the most preferred embodiment of this part of the invention, a slurry polymerization process (also called "particle form process" in this art) is carried out in an hydrocarbon diluent as inert polymerization medium. The most commonly used diluents are lower alkanes, especially isobutane.

The polymerization temperature is kept below the temperature at which the polymer becomes soluble in the diluent. Said temperature is generally comprised between 80 and 110° C., preferably between 85 and 95° C.

The polymerization pressure is generally comprised between 0.7 and 5 MPa, preferably between 0.8 and 4.5 MPa.

The catalyst is kept in suspension and is contacted with ethylene, and possibly at least one comonomer as defined above, at sufficient pressure to maintain the diluent and at least a portion of the monomer(s) in the liquid phase. The pressure and temperature are thus selected in such a way that solid particles of polymer are produced and recovered in that form. Catalyst concentration is generally such that the weight content thereof is comprised between 0.001 and 1 weight %, based on the weight of the contents of the reactor.

Hydrogen may be present in the polymerization zone. Generally, from 0.5 to 3 mole % of hydrogen, preferably from 1 to 2.5 mole %, based on the moles of the diluent in said polymerization zone, are present.

In accordance with another embodiment of the process for the preparation of the polymer of ethylene in accordance with the invention, the polymerization is carried out in the gas phase. Gas phase polymerization is generally carried out by placing a gaseous stream comprising ethylene, and possibly at least one comonomer as defined above, in contact with the catalyst in a fluidized bed. The gaseous stream flow has then to be maintained at a level high enough to maintain the polymer in a fluidized state and is thus depending from the rate of formation of the polymer and the rate of consumption of the catalyst. The partial pressure of the ethylene may be lower or higher than the atmospheric pressure, said partial pressure being generally comprised between the atmospheric pressure and 7 MPa, preferably between 0.2 and 5 MPa. The temperature is generally between 30 and 150° C. A dilution gas, inert towards the polymer, may be used.

In another embodiment of this invention, there is provided a pipe which is mouldable from the polymer of ethylene described above. Said pipe can be moulded from said polymer of ethylene by any means known in the art, typically by any known extrusion moulding method. Information on processing said polymer of ethylene by extrusion methods can be found in Modern Plastics Encyclopedia, 1992, pages 240-244 and 250-256; further information on manufacturing pipes can be found in Plastics Materials and Processes, 1982, pages 591-592.

Thanks to the use of the polymer of ethylene in accordance with the invention, it is possible to increase the throughput capabilities thereof on the extrusion equipments used to mould it into pipes (typically by increasing the screw rotations per minute (RPM)) without impairing the dimensional stability of the final pipe product due to the "wall sag" phenomenon.

Furthermore, the polymer of ethylene in accordance with the invention substantially qualifies as so-called PE3408 resins according to the U.S. Plastics Pipe Institute, Inc's 2003 Technical Report TR-3 (Policies and Procedures for Developing Hydrostatic Design Basis, Pressure Design Basis, Strength Design Basis and Minimum Required Strengths Ratings for Thermoplastic Piping Materials or Pipe).

The following examples are provided to further illustrate the invention.

EXAMPLES

Example 1

A copolymer of ethylene and 1-hexene was prepared under continuous "particle form process" conditions, comprising contacting the catalyst with the monomers, employing a liquid filled loop reactor, having a volume of about 2 m$^3$ with isobutane as the diluent. The reactor was operated to have a residence time of approximately 1,5 hours. The reactor temperature was varied over the range of 88° C. to 99° C. to control HLMI, and the pressure was 3.44 MPa. At steady state conditions, the isobutane feed rate was approximately 544 kg/h, the ethylene feed rate was about 272 kg/h, and the 1-hexene feed rate was varied to control the density of the product polymer, with an average flow of 12.9 l/h.

The catalyst used was the catalyst commercialized under the trade denomination CM-25305 by The PQ Corporation containing approximately 1% chromium and 2.4% titanium, by weight. The catalyst was activated at 650° C. under air.

The properties of the recovered copolymer, hereinafter called Polymer I, are shown in Table 1 below.

In this Table are also given, for comparison purposes, are comparable properties of three polymers of ethylene, extrudable into pipes: one commercialised by Fina under the trade name Finathene HP401N, another commercialised by Nova under the trade name Novapol HD2007H; and a third commercialised by BP Solvay Polyethylene under the trade name Fortiflex K44-06-123 and which has been manufactured in the presence of an activated chromium-based catalyst commercially available from Davison Catalysts, a division of W.R. Grace & Co.

TABLE 1

| Polymer | µ0/µ2 | (Mz/Mn) | Pent (hrs) | HLMI (g/10 min) | µ0 (Pa·s) | µ2 (Pa·s) | D (kg/m$^3$) |
| --- | --- | --- | --- | --- | --- | --- | --- |
| HP401N | 14.92 | 132.54 | >100 | 9.14 | 33992 | 2279 | 945 |
| HD2007H | 13.65 | 80.232 | >100 | 8.46 | 33563 | 2459 | 945 |
| K44-06-123 | 13.05 | 66.864 | >150 | 6.5 | 37102 | 2842 | 944 |
| Polymer I | 15.58 | 77.108 | 468 | 5.9 | 41734 | 2679 | 944 |

The contents of the Table show that the polymer of ethylene in accordance with the invention features equivalent processability, superior melt strength and excellent environmental stress crack resistance when compared to the three other commercial polymers. Even though the viscosity at 100 s$^{-1}$ (µ2) for the polymer of ethylene in accordance with the invention is comparable to those of the other polymers, the viscosity at 1 s$^{-1}$ (µ0) (representative of the melt strength) is far superior. In a typical production environment, this allows the polymer of ethylene in accordance with the invention to have better dimensional stability at the same operating conditions than the three other commercial polymers a competitive resin. At higher throughputs (higher temperatures), the polymer of ethylene in accordance with the invention would still exhibit adequate melt strength where other resins would tend to sag and deform the pipe wall.

In order to evaluate Polymer I compositionally, it was subjected to dynamic rheological measurements on ARES equipment in order to measure G' (elastic modulus) and G" (viscous modulus).

Plotting either the elastic modulus G', or the viscous modulus G", or the ratio between both (G"/G'=tan δ) as a function of ω/ωc (where ω is the measurement frequency and ωc the crossover frequency at which G"=G') has the effect of eliminating temperature and weight average molecular weight effects (assuming that the resin concerned is thermo-rheologically simple). Thus this rheological measurement can be used to compare resins effectively on the basis of molecular weight distribution and any long chain branching content only.

Rheological measurements were carried out on a dynamic rheometer (e.g., Rheometrics RDS-2, ARES) with 25 mm diameter parallel plates in a dynamic mode. For all experiments, the rheometer was thermally stable at 190° C. for at least 30 minutes before inserting the appropriately stabilised (with anti-oxidant additives), compression-moulded sample of resin onto the parallel plates. The plates were then closed with a positive normal force registered on the meter to ensure good contact. After about 5 minutes at 190° C., the plates were lightly compressed and the surplus polymer at the circumference of the plates trimmed. A further 10 minutes was allowed for thermal stability and for the normal force to decrease back to zero.

Two strain sweep (SS) experiments were initially carried out at 190° C. to determine the linear viscoelastic strain that would generate a torque signal which is greater than 10% of the lower scale of the transducer, over the full frequency (e.g. 0.01 to 100 rad/s) range. The first SS experiment was carried out with a low applied frequency of 0.1 rad/s so as to determine the sensitivity of the torque at low frequency. The second SS experiment was carried out with a high applied frequency of 100 rad/s to ensure that the selected applied strain is well within the linear viscoelastic region of the polymer so that the oscillatory rheological measurements do not induce structural changes to the polymer during testing. In addition, a time sweep (TS) experiment was carried out with a low applied frequency of 0.1 rad/s at the selected strain (as determined by the SS experiments) to check the stability of the sample during testing. The frequency sweep (FS) experiment was then carried out at 190° C. using the above appropriately selected strain level between dynamic frequencies range of $10^{-2}$ to 100 rad/s. The dynamic rheological data thus measured were then analysed using the rheometer software (viz., Rheometrics RHIOS V4.4 or Orchestrator Software) to determine the melt elastic modulus G' and viscous modulus G" at the frequency ω where ω/ωc=0.01.

Polymer 1 was compared with two lots of a resin having a density of 937.5 and an HLMI of about 12.5 g/10 min which were produced using a commercially available chromium catalyst made by Davison Catalyst. The values of tan δ at ω/ωc=0.01 were as follows:

Table of Values:

Polymer 1 (3 measurements) tan δ at ω/ωc=0.01=1.1932, 1.2267, 1.2689

Commercial resin A lot 1: tan δ at ω/ωc=0.01=1.6128

Commercial resin A lot 2: tan δ at ω/ωc=0.01=1.4968

The above data shows that the resin of the invention has a lower value of tan δ at ω/ωc=0.01, which is an example of the compositional difference between the resins of the invention and those of the prior art.

Example 2

The ethylene polymer commercialised by BP Solvay Polyethylene under the trade denomination Fortiflex K44-06-123 (hereinafter called polymer C) and the polymer of ethylene obtained in accordance with Polymer I were compared in the production of pipes having an average diameter of 100 cm and an average wall thickness of 100 mm. The night before the trial, production of this pipe size was stable at the machine upper limit of approximately 520 kg/hr using polymer C. The die was aligned to compensate for the wall sag typical for polymer C. The trial began by feeding polymer I in behind the polymer C, and machine control variables were held constant while the change in extruder throughput, amperes, and RPM were recorded. Dimensional measurements were taken on both polymers C and I after the trial was completed.

Overall, the switch from polymer C to polymer I increased production rate by 27 kg/hr (about 5%) on an extruder that was already at its maximum rpm limit. Melt temperature increased by 5.6° C., and the amperes went from 450 to 475 A (about 6%). Most importantly, pipe produced from polymer I had a much more uniform wall compared to pipe produced from polymer C (see Table 2 below). The polymer I is designed for minimal wall sag, and the material did not flow from top to bottom as much as the polymer C. This phenomenon occurred even though the polymer I exited the extruder 5° C. hotter.

TABLE 2

Dimensional Results for pipes of Ø = 100 cm

| Angle from vertical (clockwise) | Die Gap (cm) | Polymer C wall (cm) | Polymer I wall (cm) |
|---|---|---|---|
| 0° | 7.2 | 8.5 | 10.0 |
| 30° | | 8.8 | 10.2 |
| 60° | | 8.5 | 10.2 |
| 90° | 7.0 | 9.4 | 11.0 |
| 120° | | 11.8 | 11.4 |
| 150° | | 14.3 | 11.1 |
| 180° | 6.9 | 13.8 | 10.2 |
| 210° | | 14.8 | 10.2 |
| 240° | | 11.9 | 11.4 |
| 270° | 7.0 | 9.7 | 11.2 |
| 300° | | 8.9 | 10.6 |
| 330° | | 8.9 | 10.2 |
| Average | 7.0 | 10.8 | 10.7 |
| 3σ | 0.4 | 6.9 | 1.5 |
| Min | 6.9 | 8.5 | 10.0 |
| Max | 7.2 | 14.8 | 11.4 |
| Δ | 0.3 | 6.3 | 1.4 |
| Δ % of Average | 4.87% | 58.45% | 12.92% |

Table 2 provides a clear indication of the improvement obtained in extruding polymer I to produce large diameter, heavy walled pipe. The results of both compared extrusion trials are also shown diagrammatically in the enclosed FIGURE.

The enclosed FIGURE diagrammatically shows the results of both extrusion trials, using Polymer C according to the prior art and Polymer I according to the invention, to produce large diameter, heavy walled pipes. Pipe profile measurements taken at time of extrusion show melt sag when using the former versus the uniform wall distribution obtained when using the latter (drawings are not to scale)

As can be seen in the FIGURE, the wall thickness distribution of the profile produced with Polymer I is much greater than that produced with Polymer C. Statistically, the average wall thickness taken around each profile is very similar, at 10.7 cm for Polymer C profile versus 10.8 cm for Polymer I profile. However, as shown in the FIGURE, the melt sag apparent to Polymer C has been removed with utilization of Polymer I. This is reflected in the wall thickness measurements taken across the upper and lower arc segments of each profile as shown in Table 3 and the resulting average wall thickness for each arc segment.

TABLE 3

Comparative Analysis of Upper and Lower Half of Each Profile Produced from Polymer C and Polymer I

| Polymer C Profile | | | Polymer I Profile | | |
|---|---|---|---|---|---|
| Arc Segment | Angle from vertical (clockwise) | Measurement (cm) | Arc Segment | Angle from vertical (clockwise) | Measurement (cm) |
| Upper | 300° | 8.9 | Upper | 300° | 10.6 |
| | 330° | 8.9 | | 330° | 10.2 |
| | 0° | 8.5 | | 0° | 10.0 |
| | 30° | 8.8 | | 30° | 10.2 |
| | 60° | 8.5 | | 60° | 10.2 |
| | Average* | 8.72 | | Average* | 10.24 |
| Lower | 120° | 11.8 | Lower | 120° | 11.4 |
| | 150° | 14.3 | | 150° | 11.1 |
| | 180° | 13.8 | | 180° | 10.2 |

TABLE 3-continued

Comparative Analysis of Upper and Lower Half of
Each Profile Produced from Polymer C and Polymer I

| | Polymer C Profile | | | Polymer I Profile | |
|---|---|---|---|---|---|
| Arc Segment | Angle from vertical (clockwise) | Measurement (cm) | Arc Segment | Angle from vertical (clockwise) | Measurement (cm) |
| | 210° | 14.8 | | 210° | 10.2 |
| | 240° | 11.9 | | 240° | 11.4 |
| | Average* | 13.32 | | Average* | 10.86 |

*Arc average does not include wall measurements taken at 90° and 180°

From Table 3, it can be seen that the average wall thickness for the upper arc segment produced using Polymer C is 8.72 cm as compared to the average wall thickness for lower arc segment which is 13.32 cm. This represents a wall differential using Polymer C of approximately 53%. Similar analysis conducted on the pipe profile produced from Polymer I reveals an average wall thickness for the upper arc segment of 10.24 cm versus that of the lower arc segment of 10.86 cm. This represents a differential when using Polymer I of approximately 6%.

The data presented in the FIGURE and Tables 2 and 3 represent readily identifiable improvements in wall uniformity resulting from extrusion of Polymer I as opposed to Polymer C, polyethylene polymers which were extruded under identical conditions. Further, this uniformity in wall thickness (reduction in wall sag) was obtained while also achieving a 5% improvement in throughput of 27 kg/hr in pipe production as previously mentioned.

Example 3

Polymer 1b was made according to a process similar to that used in Example 1. It was evaluated in comparison with Novapol HD-2007-H (hereinafter Polymer D) for the production of large diameter, heavy wall pipe production.

The evaluation was carried out for the production of 22 inch (56 cm) SDR 7.3 pipe.

Extruder zone heat profiles were 380-400-400-400-400° F. (195-205-205-205-205° C.). Set-up conditions are noted in Table below.

TABLE 4

Extruder Set-up Conditions for 22 inch (56 cm) SDR 7.3 Pipe

| Set-Up Conditions | HD-2007-H | Polymer 1b |
|---|---|---|
| Percent Load | 68 | 66 |
| Screw Speed | 36 | 38 |
| Head Pressure - psi | 3340 | 3420 |
| Output (kg/hour) | 633 | 584 |
| Melt Temperature (° C.) | 162 | 165 |

Results indicated that the Polymer 1b ran just as well in the extruder as the HD-2007-H material. Wall thickness measurements of the 22 inch (56 cm) SDR 7.3 pipe were comparable as noted in Table 5 below.

TABLE 5

| | Resin | |
|---|---|---|
| Angle from vertical (clockwise) | HD-2007-H Wall Thickness (cm) | Polymer 1b Wall Thickness (cm) |
| 0° | 8.42 | 7.95 |
| 45° | 8.04 | 8.27 |
| 90° | 8.64 | 8.88 |
| 135° | 9.10 | 8.24 |
| 180° | 7.87 | 7.92 |
| 225° | 8.81 | 8.78 |
| 270° | 8.72 | 8.52 |
| 315° | 8.16 | 8.11 |
| Average Wall | 8.47 | 8.33 |
| Maximum | 9.10 | 8.88 |
| Minimum | 7.87 | 7.92 |
| Δ (Max − Min) | 1.23 | 0.96 |

The results above indicate that the wall thickness variation with Polymer 1b is less variable than that of the commercial resin HD-2007-H. The material exhibits a better resistance to sagging, even though the extrusion temperature is higher by 3° C.

The invention claimed is:

1. Polymer of ethylene which has:
   a $\mu_o/\mu_2$ ratio of 13 to 20; and
   a high load melt index HLMI lower than 8 g/10 min, and
   a value of tan δ at $\omega/\omega c=0.01$ of less than 1.3, where δ is G"/G', ω is the frequency at which G" and G' are measured and ωc is the frequency at which G"=G', and G' and G" are respectively the elastic modulus and viscous modulus, both measured in Pa at 190° C.

2. Polymer according to claim 1, which has a $\mu_o/\mu_2$ ratio of at least 14.

3. Polymer according to claim 1, having a density D (measured according to ASTM D 792 standard) of between 930 and 955 kg/m³.

4. Polymer according to claim 1, having a Pent test value (determined in accordance with ASTM F 1473-94 standard) higher than 150 hours.

5. Polymer according to claim 1, having a polydispersity index greater than 50.

6. Process for the preparation of a polymer of ethylene which has a $\mu_o/\mu_2$ ratio of 13 to 20 and a high load melt index HLMI lower than 8 g/10 min, comprising containing ethylene, and optionally at least one higher alpha-olefin, with a catalyst comprising chromium supported on a silica-titania support.

7. Process according to claim 6, which is conducted in the absence of a cocatalyst.

8. Process according to claim 6, wherein the polymer has a value of tan δ at $\omega/\omega c=0.01$ of than 1.3, where δ is G"/G', ω is the frequency at which G" and G' are measured and ωc is the frequency at which G"=G', and G' and G" are respectively elastic modulus and viscous modulus, both measured in Pa at 190° C.

9. Process according to claim 6, wherein the catalyst contains between 0.8 and 1.5 weight % of chromium and between 1.9 and 3.1 weight % of titanium on the support, based on the weight of the support; and the support has a specific surface area SA (measured in accordance with British Standard BS 4359/1) of between 450 and 550 m$^2$/g, a pore volume PV (measured by BET N$_2$ analysis using desorption isotherm and considering only radii of pores equal to at least 300 Angstroms) of between 1.8 and 2.7 ml/g, and an average pore diameter between 120 and 200 Angstroms.

10. Pipe comprising a polymer of ethylene as defined in claim 1.

11. Process for the manufacture of a pipe, comprising extruding a polymer of ethylene as defined in claim 1.

* * * * *